United States Patent Office 3,333,790
Patented Aug. 1, 1967

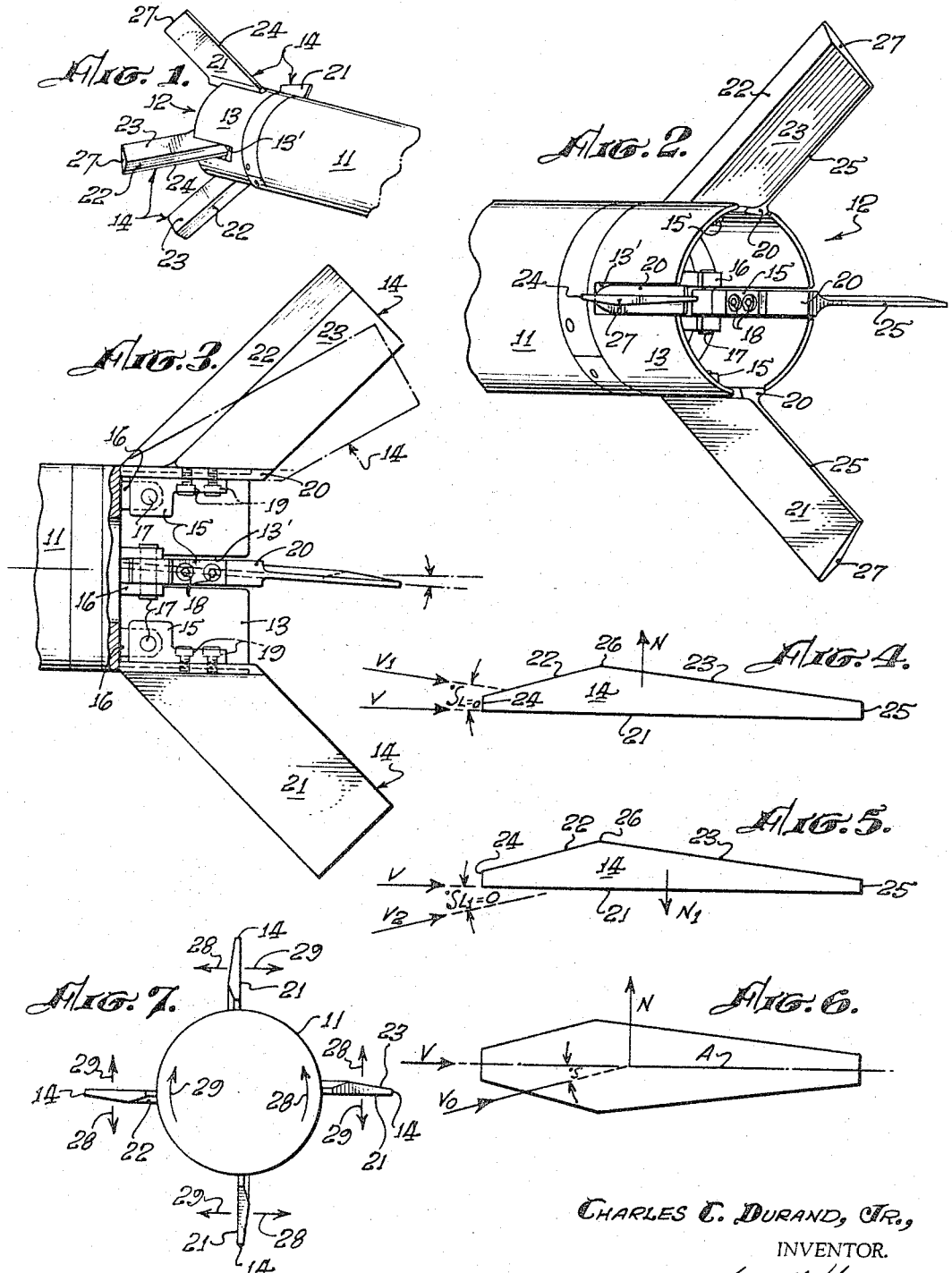

3,333,790
AERODYNAMIC ROLL CONTROL MECHANISM
Charles C. Durand, Jr., Upland, Calif., assignor to General Dynamics Corporation, Pomona, Calif., a corporation of Delaware
Filed Dec. 2, 1964, Ser. No. 416,679
14 Claims. (Cl. 244—3.23)

This invention relates in general to aerodynamic controls for airborne vehicles, and more particularly to airfoils adapted to control vehicle roll.

Heretofore, aerodynamic roll control devices, particularly those directed to the control of vehicle roll rate, have employed electromechanical and electrodynamic means for control. In both, a feedback system has generally been used which incorporates a roll rate sensor to determine the actual rate, an electronic circuit comparing the actual rate with the desired rate, and a mechanical or hydraulic device adapted to change the roll incidence or an aerodynamic surface to obtain the desired rate. Such control is continuous and accordingly requires a power supply such as a battery, hot gas generator, or the like.

Contrastingly, the mechanism of this invention provides aerodynamic roll control without the need for supporting electronic, electrical, or mechanical elements and circuitry. Effective control is provided by utilizing cambered airfoils in unique fashion to exert a roll inducing force upon an airborne vehicle, which force has a direction dependent upon the subsonic or supersonic nature of the air flow as same traverses the airfoils. In the embodiment illustrated and described herein, the invention constitutes a tail assembly consisting of four folding, non-variable tail surfaces which provide the dual function of maintaining air vehicle stability and providing roll torque to the vehicle in flight.

Although particularly effective for the governing of airborne vehicle roll rates, the present invention is not limited thereto but finds a wide variety of applications where action is desired responsive to a pre-selected condition of flow over cambered airfoils. The airfoils are thus suited to such applications as production of torque, initiative of in flight stage separation of multi-stage airborne vehicles; in flight actuation of switches and valves, the latter being within high velocity engines; compensation for adverse effects of center of gravity travel in missile stability and control; and provision of airspeed information to guidance sections of airborne vehicles. Other applications of the invention will be apparent, the foregoing being for purposes of illustration only.

Accordingly, it is an object of this invention to provide an aerodynamic roll control mechanism.

A further object of the invention is to provide a control device which provides reliable response to predetermined conditions of aerodynamic flow and thereby capable of instituting actions keyed to such conditions.

Another object of the invention is to provide a control device, the response of which is dependent upon the subsonic or supersonic condition of air flow traversing cambered airfoils and the resultant lift forces imposed thereon.

Another object of the invention is to provide an aerodynamic roll control device, as described, which is of light weight, simple, reliable, and rugged construction, and which requires no moving parts, electrical, electronic or mechanical device and no external power sources.

Another object of the invention is to provide a roll control device for an airborne vehicle which is adapted for incorporation as a part of the vehicle aerodynamic control and/or stabilizing airfoils.

Yet another object of the invention is to provide a control device broadly applicable to the initiation of actions predicated upon the subsonic or supersonic character of air flow over airfoil surfaces.

Still another object of the invention is to provide an aerodynamic roll control device capable of governing the roll rate of a vehicle responsive to the vehicle velocity.

Other objects and advantages of the invention will become apparent from the following description when taken in conjunction with the drawings in which:

FIGURE 1 is an isometric view of a tail portion of an air vehicle embodying the invention;

FIGURE 2 is a view showing the fins in the extended position;

FIGURE 3 is a view illustrating the tail fin interconnection mechanism;

FIGURE 4 is a diagrammatic view of a cambered airfoil illustrating generation of lift under subsonic conditions;

FIGURE 5 is a diagrammatic view of a cambered airfoil illustrating generation of lift under supersonic conditions;

FIGURE 6 is a diagrammatic illustration of a symmetrical cambered airfoil; and

FIGURE 7 is a diagrammatic view of the action of the invention upon the vehicle as embodied in the showing of FIGURE 1.

The invention, as illustrated, relates to a missile fin assembly designed to induce missile spin. More particularly, four asymmetrical cambered fins are mounted on separate hubs that are symmetrically disposed about the rear of the missile and which can be positioned thereon to a desired angle of sweepback and/or incidence. The cross-sectional shape of the fin is defined by three flat surfaces, one of which extends from the swept-back leading edge to the trailing edge. Of the two remaining surfaces, one extends comparatively steeply from the leading edge while the other extends less extremely from the trailing edge with both meeting at a common apex forward of the fin center. Further definition of the fin shape is provided by the trailing edge which is parallel with the swept-back leading edge and the outboard tip that is perpendicular to both. The cambered fins provide the missile with aerodynamic surfaces that affect rotation of said missile in subsonic conditions in the direction opposite to that of supersonic conditions. It should also be noted that, to provide latitude in critical Mach number (roll reversal point), the fins may be swept back at various angles.

The tail assembly shown in FIGURES 1–3 embodying the invention is part of a missile 11 having a seeker head section, a control section, a motor section, and a tail section indicated generally at 12, the missile 11 being of the tube launched type. As shown in FIGURE 1, the tail section or assembly 12 includes a shroud 13 having slots 13' therein and four cambered tail fins 14 positioned at 90 degree intervals on the periphery of the shroud 13 and extending through slots 13' in flight position. Prior to ejection from the launcher tube (not shown) the fins 14 are folded behind the missile 11 and within the launcher tube. In this folded position (not shown), the fins are designed to be canted with respect to the missile center line which provides the initial roll torque during ejection due to the impingement of ejector exhaust on the canted surfaces of the fins. As the missile 11 leaves the launcher tube, the fins 14 erect automatically, by means such as spring actuated mechanism (not shown), so that the parallel sided fins form a predetermined angle with respect to the missiles longitudinal axis. In this extended position, the fins 14 are canted at a predetermined angle with respect to the missile axis and due to this cant angle, roll torque is maintained on the missile 11 in flight.

In a specific application of the invention illustrated by FIGURES 1–3, the fins 14 are canted at an angle of 6°44′ with the missile centerline when in the folded position within the launcher tube, and canted at an angle of 38′ (minutes) with the missile axis in the extended or flight position, and the sides of the fins forming an angle of 40 degrees with the missile longitudinal axis when the fins are extended.

The cambered tail fins 14 are attached to the missile 11 through tail hubs 15 which are pivotally mounted on support members 16 by pins 17, support members 16 being fixed to the inner surface of missile 11. Tail hubs 15 are operatively connected to tail fins 14 by means such as capscrews 18 which extend through countersunk apertures 19 in hubs 15 and into enlarged butt portions 20 of fins 14 (see FIGURES 2 and 3). Butt portions 20 additionally serve to close the slots 13′ when fins 20 are extended in flight position.

Referring now to the details of cambered fins 14 as illustrated in FIGURES 1, 4, and 5, the fins are each of an asymmetrical cross-section configuration and constructed from a single piece of material, such as steel. The fins 14 each include the base or butt portion 20 and a body portion which defines a flat bottom surface 21 and a top surface made up of two inclined surfaces 22 and 23, surface 22 being inclined from the leading edge 24 rearwardly with surface 23 being inclined from the trailing edge 25 forwardly and defining an apex 26. Fins 14 each also include an outboard edge or tip 27 which is perpendicular with respect to the leading and trailing edges 24 and 25.

The critical Mach number of an airfoil is the maximum value of the free stream Mach number below which supersonic flow does not appear on the profile. Therefore, in this description, subsonic conditions mean Mach numbers less than critical, and supersonic conditions mean Mach numbers greater than critical.

A symmetric airfoil is shown in FIGURE 6 with the reference axis A as the line of symmetry. The incidence angle $\cdot f$ lies between the reference axis A and the velocity vector $V°$. When the incidence angle $\cdot f$ is zero (along the vector V) the pressure distributions on the top and bottom of the section or fin are equal and no lifting force is generated. When the incidence angle $\cdot f$ is finite and positive, as illustrated by the vector $V°$, there exists a greater pressure on the bottom than top and lift is developed as illustrated by the arrow N, wherein N is the lifting force normal to the reference axis A.

If only the top half of the FIGURE 6 airfoil is considered, at subsonic conditons, then lift is generated at zero incidence indicated by vector V in a direction shown by arrow N in FIGURE 4. At this condition the pressure on the bottom surface 21 also exceeds the pressure on the top of the profile (surfaces 22 and 23). By rotating the section or fin 14 counterclockwise an incidence angle $\cdot f$ at which the lift is equal to zero ($L=0$) is attained. This angle ($\cdot fL=0$) is fairly constant for the subsonic condition and is called the angle of zero lift (see FIGURE 4). It thus follows that with an angle greater than angle ($\cdot fL=0$), under subsonic conditions, the lift L is negative.

A symmetric airfoil or section as illustrated in FIGURE 6 will behave in supersonic flow much the same as it did in subsonic flow described above. However, the unsymmetric profile (cambered) has different characteristics. The same profile illustrated in FIGURE 4 is considered in FIGURE 5 for the case of supersonic flow. Again lift is generated at zero angle of incidence $(\cdot f=0)$, as indicated by velocity vector V, but the lift direction is reversed as indicated by the arrow $N_1$, The section or fin 14 must now be rotated clockwise to achieve zero lift ($L=0$). The angle of zero lift $(\cdot fL_1=0)$ is said to be positive contrary to the subsonic angle of zero lift $(\cdot fL=0)$ which was shown to be negative. The magnitude of the supersonic zero lift angle varies slightly with supersonic Mach number, but the direction remains the same since it is the supersonic nature of the flow which causes the pressure on the top (surfaces 22 and 23) of the section to exceed that on the bottom (surface 21). It thus follows that with an angle greater than angle $(\cdot fL_1=0)$, under supersonic conditions, the lift L is positive.

Near the critical Mach number, both subsonic and supersonic flow exist simultaneously and a transition is made from negative to positive angles of zero lift. At this condition the flow is very complex in nature; however, the transition is fairly abrupt.

When attached to a vehicle such as missile 11 as shown in FIGURE 7 with the cambered side (surfaces 22 and 23) of each panel or fin 14 located counterclockwise when viewed from the rear, the resulting lift vectors form couples which will spin the missile 11 in a pin wheel fashion. The spin direction will be in the direction of camber (counterclockwise) for subsonic Mach numbers as indicated by arrows 28 and in the reverse direction (clockwise) for supersonic conditions as indicated by arrows 29.

The missile Mach number at which the individual roll surfaces or fins 14 attain the critical Mach number can be varied by sweeping the fins 14 as indicated in phantom lines in FIGURE 2. Thus, the missile Mach number at which roll reversal takes place can be controlled by an appropriate choice of sweep angle of fins 14 It should be noted however, that the configuration (length and width) of the fins 14 would change with various sweep angles to provide the zero lift characteristic described above.

The angle of zero lift is analogous to the incidence angle of the symmetric section; therefore, with respect to a particular reference line in a cambered section or fin, the incidence angle can be considered to be controlled in direction by Mach number. Thus, the incidence angle of zero can be controlled in magnitude by the amount of asymmetry or camber on the section or by cambering one side more than the other. The net end is a variable incidence system with no moving parts or actuators in which roll torque can be controlled both in magnitude and direction by a preflight choice of dimensions depending on the desired result.

In has been shown that a combination of camber and a preset fixed incidence can be used if the direction of roll torque and, hence, rate is desired to be constant. The combination may be designed in such a way so as to compensate for large changes in velocity when a constant magnitude and direction is desired. In view of tests conducted, if a $\pm 1$ cycle per second tolerance is assumed, the combination of camber and incidence was successful over 95 percent of the flight time observed compared to 15 percent for uncambered configurations.

It has thus been shown that the present invention provides an aerodynamic roll control mechanism comprised of a plurality of asymmetrical cambered airfoils positioned with respect to the vehicle longitudinal axis and secured thereto in sweptback relation. The airfoils are each characterized by leading and trailing edges defining a flat bottom surface therebetween and which are each perpendicular to the outer edge or tip. The camber of the airfoils is defined by the flat surface to which are oppositely inclined forward and rearward surfaces extending respectively from the leading and trailing edges of the airfoil and meeting at an apex forward of the airfoil transverse axis. The airfoils are disposed with their apexes upon opposite sides of the vehicle longitudinal axis, i.e., in similar clockwise or counterclockwise orientation, so as to exert a force coupler acting upon the vehicle in one direction during subsonic flight and in the opposite direction during supersonic flight.

While the invention has been illustrated as employing two pairs of diametrically opposed airfoils, the number of airfoils which may be employed is subject to considerable variation depending upon the desired application. Also, the tail hubs 15 which support fins 14 may be of an adjustable type to provide a variation of the airfoil incidence angle and sweep angle.

Although a particular embodiment of the invention has been illustrated and described, modifications will become apparent to those skilled in the art, and it is intended to cover in the appended claims all such modifications as come within the spirit and scope of the invention.

What I claim is:

1. An aerodynamic roll control mechanism for an air vehicle comprising a plurality of fins having leading and trailing edges, each of said fins including a flat surface on one side thereof, a cambered surface on the side opposite said flat surface, and an outboard surface perpendicular to the leading and trailing edges thereof.

2. The aerodynamic roll control mechanism defined in claim 1, wherein said plurality of fins are each canted with respect to the direction of movement thereof.

3. The aerodynamic roll control mechanism defined in claim 1, wherein said plurality of fins are each positioned in a sweptback plane relationship with respect to the longitudinal axis of an associated air vehicle.

4. The aerodynamic roll control mechanism defined in claim 1, wherein said cambered surface of each of said fins includes a first surface inclined rearwardly from said leading edge and a second surface inclined forwardly from said trailing edge, said first and second surfaces defining an apex forward of the transverse axis of said fin.

5. A device responsive to subsonic or supersonic flow conditions for controlling the roll rate of a vehicle including a plurality of asymmetrical cambered airfoils symmetrically disposed around the vehicle and at a sweepback angle with respect to the vehicle; each of said airfoils including a butt portion operatively connected to said vehicle and a body portion aerodynamically configured to be responsive to subsonic or supersonic flow conditions; said body portion of each airfoil including parallel leading and trailing edges, a flat surface on one side thereof extending between said leading and trailing edges, and a cambered surface on the side opposite said flat surface; said cambered surfaces being oriented in the same direction about said vehicle, whereby said airfoils respond to subsonic flow conditions so as to rotate the vehicle in a first direction and respond to supersonic flow conditions so as to rotate the vehicle in the opposite direction.

6. The device defined in claim 5, wherein said body portions of said airfoils each additionally include an outboard surface perpendicular to said leading and trailing edges.

7. The device defined in claim 5, wherein said cambered surface of each of said airfoils comprises a first surface inclined rearwardly from said leading edge and a second surface inclined forwardly from said trailing edge, said first and second inclined surfaces joining at an apex forward of the airfoil cross-sectional center.

8. The device defined in claim 5, wherein said airfoils are canted with respect to the direction of movement of the vehicle.

9. An aerodynamic roll control device for an airborne vehicle comprising, in combination: at least two asymmetrical cambered airfoils, each airfoil having spaced apart leading and trailing edges bounding a first surface and having a cross section defined by said first surface and by oppositely inclined forward and rearward cambered defining surfaces respectively extending from said leading and trailing edges to a common apex line extending longitudinally of the airfoil substantially forward of its longitudinal axis, and means for mounting said airfoils upon opposite sides of the vehicle body for projection into the airstream with the leading and trailing edges thereof angularly disposed to the streamwise air flow with the cambered portions of each airfoil being oppositely directed to coact as a force coupler to impose a roll inducing torque acting in one direction upon the vehicle in subsonic airstream flow and roll inducing torque acting in the opposite direction upon the vehicle in supersonic airstream flow.

10. An aerodynamic roll control device for an airborne vehicle comprising, in combination: at least two asymmetrical cambered airfoils, each having spaced apart leading and trailing edges bounding a first surface and having a cross section defined by said first surface and by oppositely inclined forward and rearward surfaces respectively extending from said leading and trailing edges to form the airfoil camber, and means for mounting said airfoils upon the vehicle at opposite sides of the vehicle longitudinal axis for projection into the air stream with the airfoil leading and trailing edges angularly disposed to the streamwise air flow with the cambered portions of each airfoil being oppositely directed to coact as a force coupler to impose roll inducing torque acting in one direction upon the vehicle in subsonic air stream flow and a roll inducing torque acting in the opposite direction upon the vehicle in supersonic air stream flow.

11. An aerodynamic roll control device for an airborne vehicle comprising, in combination: at least two airfoils each having asymmetrical cross sections with cambered portions productive of lift acting transversely of the airfoil chord in one direction during subsonic air flow and in an opposite direction during supersonic air flow, and means for mounting said airfoils upon the vehicle at opposite sides of the longitudinal axis thereof for chordwise projection into the air stream with the cambered portions of each airfoil being oppositely directed to coact as a force coupler to impose a roll inducing torque acting in one direction upon the vehicle in subsonic air stream flow and a roll inducing torque acting in the opposite direction in supersonic air stream flow.

12. A roll control mechanism for missiles adapted to be launched from a tube type launcher for initiating missile roll and controlling the roll rate of the missile during subsonic and supersonic flight conditions comprising: two pairs of diametrically opposed asymmetrical cambered airfoils disposed about the rear of the missile; each airfoil when in flight position being angularly disposed with respect to longitudinal axis of the missile; each of said airfoils including butt portion operatively connected to said missile and a body portion aerodynamically configured to be responsive to subsonic or supersonic flow conditions; said body portion of each of said airfoils including parallel leading and trailing edges, a flat surface on one side thereof extending between said leading and trailing edges, and a cambered surface on the side opposite said flat surface; said cambered surfaces of said airfoils being oriented in the same direction about said missile; each of said airfoils being canted with respect to the missile axis, whereby said airfoils are disposed at the rear of said missile when said missile is positioned in the associated launch tube and adapted to initiate roll of the missile by the flow of exhaust gases from the missile across the canted airfoils during launch of the missile, and whereby said airfoils are extended to flight position upon launch of the missile and respond to subsonic flight conditions so as to rotate the missile in one direction and respond to supersonic flight conditions so as to rotate the missile in the opposite direction.

13. The roll control mechanism defined in claim 12, wherein said body portions of said airfoils each additionally include an outboard surface perpendicular to said leading and trailing edges.

14. The roll control mechanism defined in claim 12, wherein said cambered surface of each of said airfoils includes a first surface inclined rearwardly from said leading edge and a second surface inclined forwardly from said trailing edge, said first and second inclined surfaces terminating in a common apex line extending longitudinally of the airfoil and forward of the airfoil longitudinal axis.

References Cited

UNITED STATES PATENTS

| 3,113,517 | 12/1963 | Kelly et al. | 102—3 |
| 3,185,097 | 5/1965 | Cushing et al. | 102—50 |

FOREIGN PATENTS

| 1,137,788 | 1/1957 | France. |

BENJAMIN A. BORCHELT, *Primary Examiner.*

SAMUEL FEINBERG, *Examiner.*

V. R. PENDEGRASS, *Assistant Examiner.*